Nov. 30, 1948.   E. LAXO   2,455,127
CONVEYER GRIPPER MEMBER FOR CAN BODIES
Filed Oct. 8, 1946
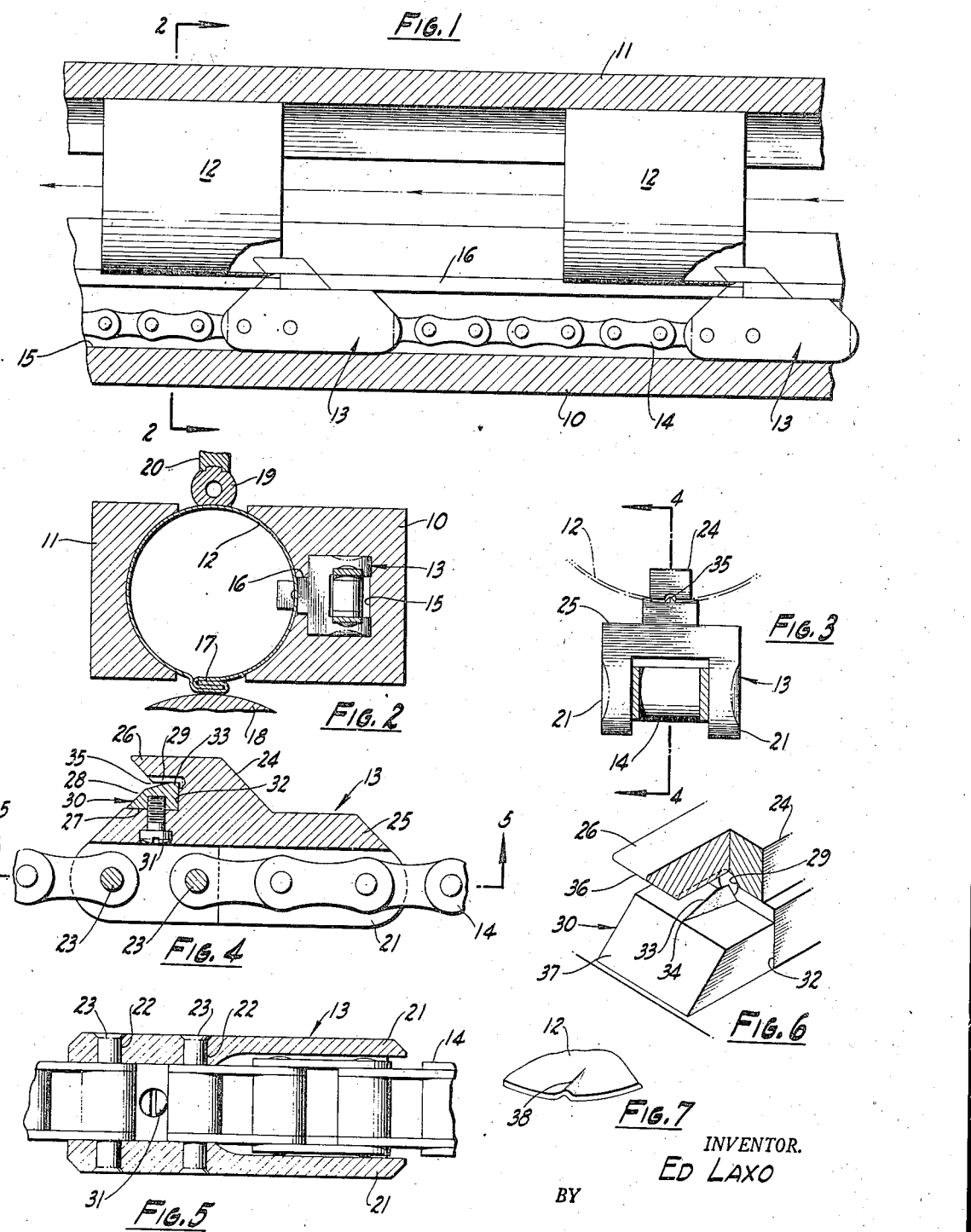
INVENTOR.
ED LAXO
BY
Mellin & Hanscom
ATTORNEYS Patented Nov. 30, 1948

2,455,127

UNITED STATES PATENT OFFICE 2,455,127

CONVEYER GRIPPER MEMBER FOR CAN BODIES

Ed Laxo, Oakland, Calif., assignor to Atlas Imperial Diesel Engine Co., Oakland, Calif., a corporation of Delaware Application October 8, 1946, Serial No. 701,975

4 Claims. (Cl. 198—179)

This invention relates to can making machinery, and more particularly to elements of conveyers for positively feeding can bodies along a predetermined path through one or more work stations.

In the movement of can bodies through certain operational work stations it is essential that they be prevented from turning on their axes to insure the proper performance of the operation. For example, in the soldering of a can side seam, there is line contact between the can body and a solder roll over which it is conveyed. Slight turning of the body would remove the side seam from contact with the periphery of the solder roll, resulting in improper sealing of the seam and a defective can.

It has been proposed heretofore to prevent turning of a can body by the use of gripper members or fingers which key or jam the body and thus insure the maintenance of the side seam in alignment with the solder roll or other solder applying element. These prior devices, however, have been difficult to manufacture and assemble in properly adjusted position with respect to the conveyer chain; oftentimes failing to produce the desired keying or gripping action on the can bodies.

It is, accordingly, an object of the present invention to provide a conveyer gripping member for propelling a can body along a predetermined path, which is easier to manufacture and adjust properly, and which prevents turning of the can body about its axis by insuring its positive locking to the conveyer.

Another object of the invention is to provide a readily releasable lock for preventing turning of a can body about its axis as it is propelled through a work station by a conveyer.

One form which the invention may assume is exemplified in the following description and illustrated by way of example in the accompanying drawings, in which:

Figure 1 is a longitudinal section disclosing the conveying of can bodies through the soldering station of a side seamer.

Figure 2 is a cross-section taken along the line 2—2 on Figure 1.

Figure 3 is a forward end view of one of the gripper members on a conveyer chain.

Figure 4 is a section taken along the line 4—4 on Figure 3.

Figure 5 is a section taken along the line 5—5 on Figure 4.

Figure 6 is an isometric view, partly in section, of the gripping portion of the gripper member.

Figure 7 is a fragment of the end of a can body disclosing the locking key or projection formed by the gripper member.

The invention is disclosed in the drawings as applied to a side seamer having opposed guide and support rails 10, 11 between which can bodies 12 are to be propelled by gripping dogs or members 13 forming part of a conveyer chain 14 passing through a slot 15 formed in one of the side rails. The gripping dogs 13 extend through a lengthwise opening 16 in the rail 10 communicating with the slot 15. Each can body 12 is fed by the conveyer chain along and between the side rails, with the side seam 17 of the can disposed in a lowermost position in contact with or closely adjacent to the periphery of a rotating solder roll 18, and with the upper end of the can body engaging a top guide bar 19 of a hollow tube soldering horn attached to the top rail 20 of the apparatus.

The can bodies 12 are propelled through the side seamer and between the guide rail bars by appropriately spaced can supporting and retaining attachment links 13 forming part of the conveyer chain 14. The gripper portions of these links 13 engage the ends of the can bodies and convey them along the solder roll 18 with their side seams 17 properly disposed with respect thereto.

Each can supporting link 13 is generally channel-shaped, with its side plates 21 having holes 22 spaced in conformance with the holes in the conventional links of the conveyer chain for the reception of link pins 23 pivotally attaching the side plates to the other link members. The side plates 21 thus form part of the conveyer chain itself. They preferably have a length in excess of the length of the conventional chain link to increase their bearing surface against the guiding sides of the rail slot 15 and avoid deflections in the chain that might be imposed by alternate conditions of slack or tension, or by overhang of the can body secured to the attachment link 13.

Each attachment link has a relatively narrow member 24 integral with and extending outwardly from its base 25 for engagement with the end of a can body. The outer portion 26 of this member projects in a forward direction and is spaced from a flat base link portion 27 to provide a forwardly opening slot 28. The outer side of the slot has a longitudinally extending, transversely curved recess 29 substantially parallel to the base portion 27 of the block. As specifically illustrated in the drawing, this recess is formed by a half round hole drilled into the outer side of the slot.

The opposite side 27 of the slot is flat and generally parallel to the other slot wall, extending longitudinally inwardly to substantially the same extent as the half round recess hole 29. A lock block 30 is secured within the slot 28 to the member 24 by a screw 31 extending through the base 25 of a channel shaped body portion and threadedly received in the block. This screw holds the block 30 against the side 27 and bottom 32 of the slot in spaced relation to the recess side of the slot.

The outer portion of the lock block 30 has a longitudinal ridge or projection 33 inclined upwardly toward the rearward end of the recess 29. This projection is of gradually increasing height and of generally triangular cross-section forming a ridge of generally pyramidal configuration whose vertex 34 extends toward the forward end of the slot 28. The projection 33 and recess 29 provide a convergent passage 35 into which the end of the can body wall is movable.

In the use of the device, the dog member 24 of the conveyer chain 14 moves toward the end of a can body 12, which passes between the beveled surfaces 36, 37 on the member and block into the convergent passage 35 formed by the recess 29 and projection 33. The latter presses the wall of the can body into the cooperable curved recess 29 forming a longitudinally tapering indentation 38 in the wall which is wedged in the recess 29 by the projection 33. In this manner, turning of the can body relative to the attachment link 13 and conveyer chain 14 is prevented.

By virtue of the arrangement disclosed, the can side seam 17 is maintained in proper alignment with the solder roll 18 as the conveyer feeds it over the latter member, insuring the proper soldering of the seam. The projection 38 on the can body 12 is formed positively as the can enters the passage 35 of the attachment link, producing an extended key or indentation in each can body in a positive manner. The tapered form of the body key 38 produced not only provides the desired positive lock against turning of the can body, but it also insures ready detachment of the body from the conveyer, since only a slight withdrawal of the body from the convergent passage 35 is sufficient to loosen the grip by the projection 33 and side edges of the recess 29.

The parts may be manufactured and assembled accurately and readily. The convergent passage 35 between the lock block 30 and wall of the curved recess 29 is relatively small and would present production difficulties if all of the parts were integral with each other. By providing a relatively wide slot 28 between the recess 29 and the base 27 engaging the lock block 30, the parts may be machined accurately in a milling machine, or other suitable machine tool.

The lock block 30 can be made accurately as a separate element and then placed and held in proper assembled position by the screw 31. When the parts are assembled, the lock block 30 and its elongate projection 33 are disposed properly in alignment with the curved recess 29 to insure the appropriate locking of the can body 12 to the attachment link 13, with the can body side seam 17 in alignment with the periphery of the solder roll 18.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A gripping device for can bodies and the like, comprising a first jaw and a second jaw spaced from and in alignment with said first jaw, said first jaw having a longitudinal slot formed therein opposing and opening toward said second jaw, and a block secured to said second jaw and facing said first jaw, said block having a longitudinal projection in alignment with said slot, said first jaw and block being so shaped as to define an open-ended, inwardly converging recess adapted to receive a can body and so spaced that said projection is adapted to press said body into said slot and form an indentation therein.

2. The device of claim 1, wherein said projection tapers upwardly in width and forwardly in height.

3. A gripping device for can bodies and the like, comprising a block having forwardly extending, spaced, opposing jaws comprising a first jaw and a second jaw, said first jaw having a forward lip tapering forwardly in thickness and having a longitudinal groove formed therein rearwardly of said lip, a separate block secured to but detachable from said second jaw and having an oppositely tapering forward portion and also having a longitudinal projection thereon rearwardly of said forward portion and in alignment with said groove, said projection tapering forwardly in height and being so spaced from said groove as to provide a recess for receiving a can body and to press the same into said groove to form an indentation therein.

4. A gripping device for can bodies and the like, comprising an integral member having a first jaw and a second jaw spaced from one another and in alignment, said first jaw having a forward lip tapering forwardly in thickness and having a longitudinal groove formed therein rearwardly of said lip, and a lock block secured to and seated upon said second jaw so as to be readily removable therefrom and having an oppositely tapering forward portion and having a longitudinal projection formed thereon rearwardly of said forward portion and in alignment with said groove, said projection tapering forwardly in height and upwardly in width and being so spaced from said groove as to provide a recess for receiving a can body and to press the same into said groove to form an indentation therein.

ED LAXO.

REFERENCES CITED

The following references are of record in the file of this patent:

UNITED STATES PATENTS

| Number | Name | Date |
| --- | --- | --- |
| 1,223,962 | Godley | Apr. 24, 1917 |
| 2,319,280 | Widell | May 18, 1943 |
| 2,319,281 | Winters | May 18, 1943 |